United States Patent [19]

Aylsworth et al.

[11] 3,964,672

[45] June 22, 1976

[54] PUNCHING, READING AND PRINTING MACHINE FOR DOCUMENT CARDS

[75] Inventors: William Kenneth Aylsworth, Rochester; Willard Leon Gudgel, Byron; Richard William Luoma, Chatfield, all of Minn.

[73] Assignee: International Business Machines Corporation, Armonk, N.Y.

[22] Filed: May 24, 1974

[21] Appl. No.: 473,250

[52] U.S. Cl. ............................. 234/35; 83/417; 234/128; 234/129; 271/10; 271/149
[51] Int. Cl.² ................................................ G06K 1/20
[58] Field of Search .................. 234/128, 129, 130; 83/417, 281; 271/10, 149, 150; 234/35

[56] References Cited
UNITED STATES PATENTS

| | | | |
|---|---|---|---|
| 1,530,209 | 3/1925 | Scheuner | 271/150 X |
| 2,163,145 | 6/1939 | Johnson | 271/150 |
| 2,759,729 | 8/1956 | Hedlun | 271/10 |
| 2,812,179 | 11/1957 | Gleason | 271/150 X |
| 3,002,677 | 10/1961 | Haney | 234/128 X |
| 3,035,834 | 5/1962 | Bottrell | 271/149 X |
| 3,642,197 | 2/1972 | Bean et al. | 234/35 |
| 3,811,377 | 5/1974 | Chalson et al. | 234/35 UX |

*Primary Examiner*—J. M. Meister
*Attorney, Agent, or Firm*—Keith T. Bleuer

[57] ABSTRACT

A punching, reading and printing machine for document cards having a hopper holding the cards in vertical disposition, card transporting means moving the cards out of the hopper into horizontal disposition in a horizontal card path and closely spaced punching, reading and printing mechanisms operative on the cards while in the horizontal path. The punching mechanism includes a row of punches extending transversely of the card path each made active by an interposer and a leaf spring actuator for the interposer, and the printing mechanism includes a row of print hammers extending longitudinally of the card path and an electromagnet and armature for each of the print hammers. The interposer springs extend longitudinally of and over the path of card travel preceding the punches, and the armatures extend transversely of the machine for shortening the machine and rendering it more compact.

3 Claims, 13 Drawing Figures

PUNCHING, READING AND PRINTING MACHINE FOR DOCUMENT CARDS

CROSS REFERENCE TO RELATED APPLICATION

This application is related to the application on "Hopper Mechanism," Ser. No. 461,469, filed Apr. 16, 1974 by Mark C. Agnew, James J. Best and Willard L. Gudgel.

BACKGROUND OF THE INVENTION

The invention relates to a punching, reading and printing machine for document cards.

Some machines of this general type, such as that disclosed in U.S. Pat. No. 3,642,197, have included a hopper holding a document card deck in substantially vertical disposition, with the cards being fed off of one end of the card deck onto a generally horizontal transport bed. After leaving the card hopper, the cards were transported to punching, reading and printing mechanisms, while remaining in horizontal disposition, and the printing mechanism comprised a rotatable wheel with a row of print characters on its periphery and mounted so that its axis extended transversely of the path of card movement. Each character along a line of printing extending longitudinally of a document card was produced by the single row of print characters, and the swingable print hammers for providing the printing in connection with the print characters on the wheel extended longitudinally of the path of card travel. Since each of the characters in the row of printing was produced by the single character row, the machine was relatively slow.

SUMMARY OF THE INVENTION

It is an object of the present invention to provide an improved punching, reading and printing machine for document cards which is more compact, considering the dimensions of the document cards that are used, and is faster than prior such machines.

More particularly, it is an object of the present invention to provide an improved punching, reading and printing machine for document cards including a hopper holding the document cards in vertical disposition individually and overlying the subsequent horizontal transport bed of the machine so that, in effect, the document cards are fed in one direction in the hopper toward one end of the machine and are then moved out of the hopper and are turned through 90° so that the cards then travel horizontally, beneath the remaining vertically stacked document cards in the hopper.

It is also an object of the invention to provide subsequent closely spaced punching, reading and printing mechanisms effective on the cards as they continue horizontal travel. It is contemplated that each of the cards may be provided with a single line of print by means of the printing mechanism and that the speed of the cards shall be so great that a single print row on a print drum cannot provide all of the different characters that should be printed at any one printing position on this line. Therefore, it is an object in connection with a machine of this type to provide a printing mechanism comprising a drum with a plurality of print rows, each containing a portion of the characters to be printed, with the drum being disposed with its axis extending in the same direction as the cards move through the print mechanism. In this connection, it is also an object of the invention to provide, in connection with a print hammer for each of the rows, a hammer actuating armature that extends transversely of the machine for rendering the machine quite compact.

It is a further object to provide, in connection with a series of punches that extend transversely in a row across the direction of card travel in such a machine, an interposer for each of the punches disposed on the end of a longitudinally movable leaf spring interposer actuator, with the leaf springs extending in the same direction as the path of card travel and above this path upstream of card movement, for efficiently utilizing the available space.

DESCRIPTION OF THE PREFERRED EMBODIMENT

Figure 1:
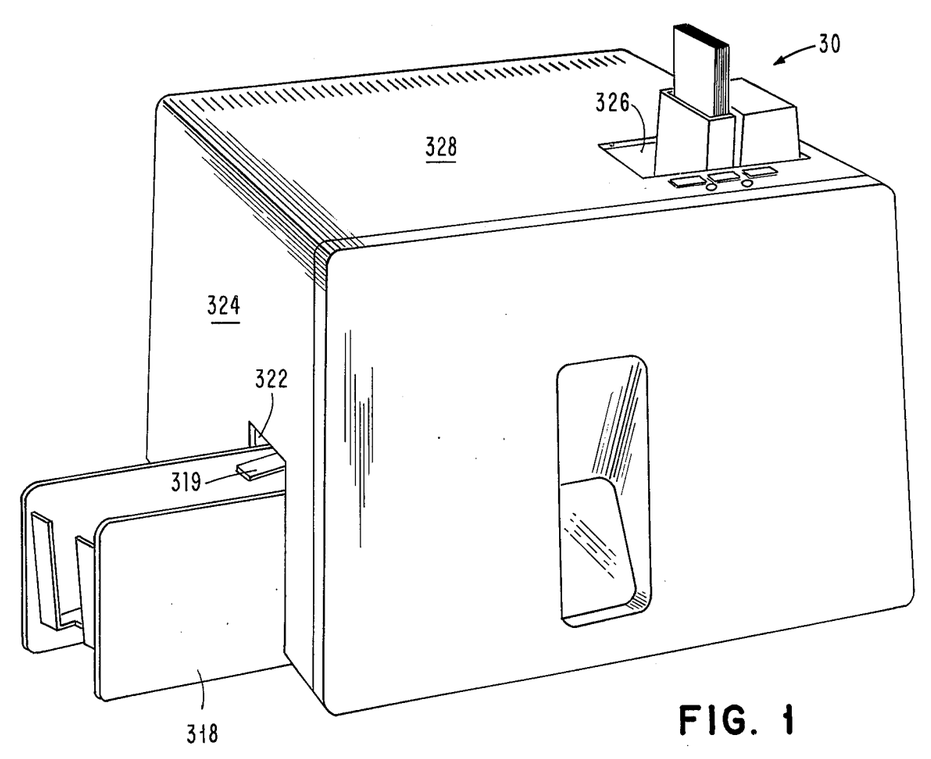
FIG. 1 is a perspective view of the card machine of the invention.
Figure 2:
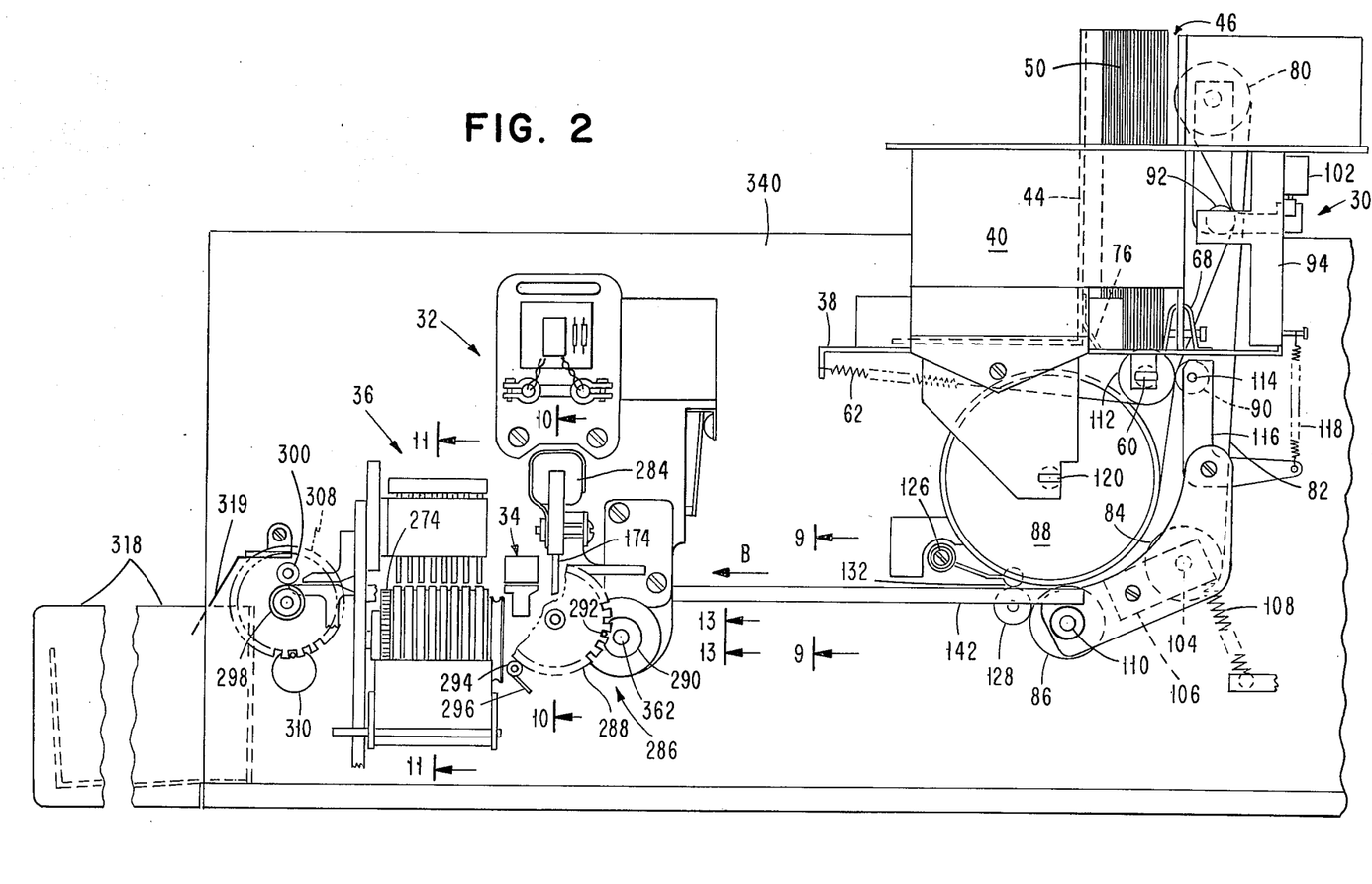
FIG. 2 is a front elevational view of the internal mechanism of the machine.
Figure 4:
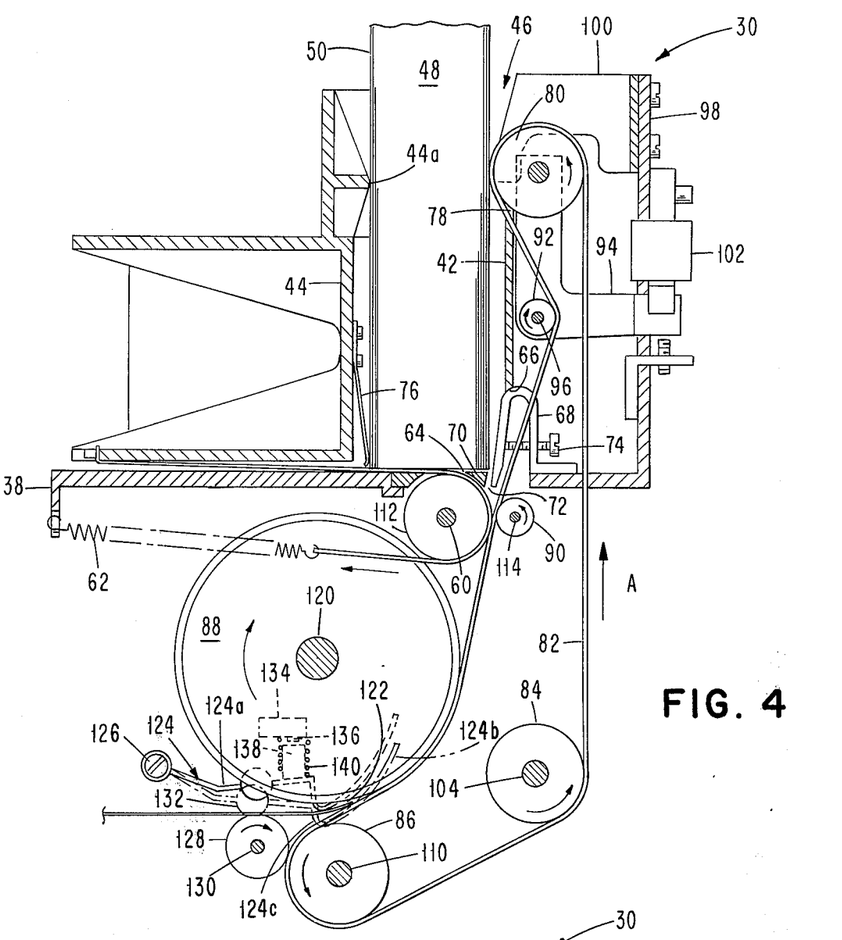
FIG. 4 is a vertical sectional view of the hopper mechanism of the machine at a first end of the machine.
Figure 5:
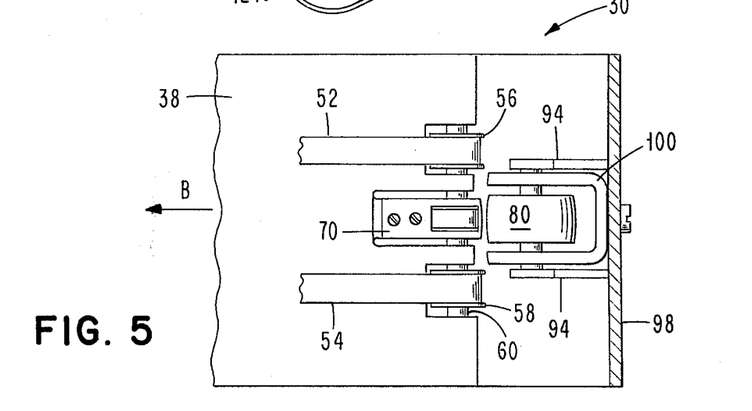
FIG. 5 is a plan view of the hopper mechanism of the machine.

Referring now to FIGS. 1, 2 and 4 in particular, the card machine of the invention may be seen to comprise generally a hopper mechanism 30, a punch mechanism 32, a read mechanism 34 and a print mechanism 36.

The hopper mechanism 30 may be seen to comprise a horizontal hopper base 38, hopper sides 40 and a front panel 42 (see FIGS. 2 and 4). The sides 40 and panel 42 are preferably formed integrally and are fixed by any suitable means on the base 38. A back shoe 44 is movably disposed with respect to the base 38 and is adapted to move between the hopper sides 40. The sides 40, the front panel 42 and the back shoe 44 together form a hopper 46 for receiving a deck 48 of document cards 50 which individually are in vertical disposition. The back shoe 44 is provided with a forwardly extending protrusion 44a for contacting the rearwardmost document card 50 in the deck 48.

A pair of thin, flexible steel ribbons or straps 52 and 54 extend across the upper face of the hopper base 38 and are hooked at their ends to the end of the back shoe 44. The ribbons 52 and 54 respectively extend around rolls 56 and 58 rotatably disposed on a shaft 60 which is fixed with respect to the base 38. A spring 62 extends between an end of the hopper base 38 and each of the ribbons 52 and 54 so as to put a spring force on the back shoe 44 tending to move the back shoe toward the panel 42.

The hopper base 38 is provided with an opening 64 in it, and the panel 42 is provided with a corresponding slot 66 in alignment with the opening 64. A U-shaped throat ramp 68 is fixed on the base 38 and extends into the slot 66 and opening 64. A throat knife 70 is fixed to the base 38 and also extends into the opening 64 so as to provide a relatively thin throat gap 72 between it and the ramp 68. The ramp 68 has a set screw 74 extending through one leg of the ramp and into contact with the other leg so that the gap 72 may be adjusted in width by means of the screw 74. A throat spring 76 is fixed at its upper end to the back shoe 44 and is disposed opposite the throat ramp 68.

The panel 42 is provided with an opening 78 therein, and a pulley 80 is located so that the pulley may move through the opening 78. An endless hopper pick and drive belt 82 extends around the pulley 80 and, in addition, extends around rolls 84, 86, 88, 90 and 92. The roll 80 is swingably mounted on bell cranks 94 pivoted on a fixed shaft 96 supported from a standard 98 that is integral with the hopper base 38. A U-shaped deck support member 100 is fixed to the standard 90 and has its two legs on opposite sides of the roll 80 and extends farther to the left as seen in FIG. 2 than the roll 80 when the roll 80 is in its retracted position. An electromagnet 102 is effective on the ends of the bell cranks 94 opposite the roll 80 for moving the roll 80 into the opening 78 when the electromagnet 102 is energized.

The roll 84 is rotatably mounted on a shaft 104 carried by swing arms 106 (see FIG. 2) on which a spring 108 is effective. The roll 86 is fixed on a shaft 110 that is rotatable with respect to the hopper base 38. The shaft 110 may be driven for driving the roll 86 and the belt 82. A roll 112 is rotatably disposed on the shaft 60 and is located opposite the roll 90. The roll 90 is rotatably disposed on a shaft 114, and the shaft 114 is carried by swing arms 116. A spring 118 is effective on the arms 116 so as to urge the roll 90 toward the roll 112. The roll 88 is mounted on a shaft 120 which is fixed with respect to the hopper base 38.

It will be observed from FIGS. 2 and 4 that the rolls 90 and 92 are relatively small in diameter, that the roll 88 is relatively large in diameter and that the rolls 80, 84 and 86 are of intermediate diameters. The belt 82 extends around the roll 88 for an arc of nearly 90 degrees, and the rolls 88 and 86 are so spaced so as to provide a gap 122 between the belt 82 and the outer surface of the roll 88.

A registration arm 124 is pivotally mounted on a shaft 126 that is fixed with respect to the hopper base 38. The arm 124 has a main portion 124a, a terminal cam portion 124b and a card registration portion 124c. The terminal portion 124b, when there is no card 50 in the gap 122, is in alignment with the gap 122 and extends generally in the same direction as the peripheral surface of the roll 88 but at a greater angle toward the shaft 120 supporting the roll 88. Under these conditions, the card registering portion 124c of the registration arm 124 extends across the gap 122, approximately bridging the gap between the surface of the roll 88 and the portion of the belt 82 suppported by the roll 86.

A reversely turning roll 128 is rotatably supported on a fixed shaft 130 and is in engagement with the belt 82 as supported by roll 86. The main portion 124a of the arm 124 carries a roller 132 rotatably disposed with respect to the arm 124; and, when the registration arm 124 is at its lowermost limit of its movement as seen in FIG. 2, with no card 50 in the gap 122, the roller 132 is in contact with the roll 128.

Figure 9:
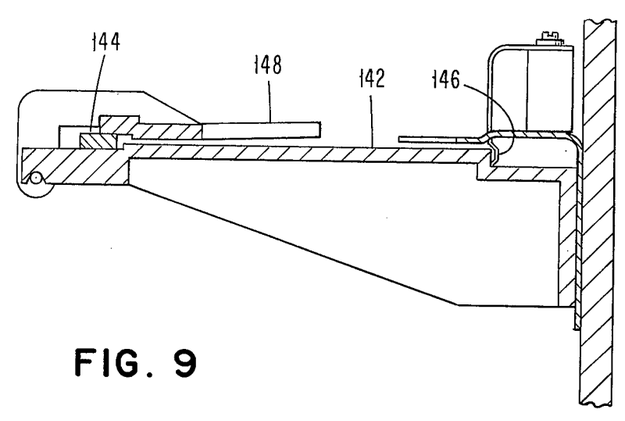
FIG. 9 is a sectional view on an enlarged scale taken on line 9—9 of FIG. 2.

A registration switch 134 (see FIG. 4) is fixed with respect to the hopper base 38 and has an actuator 136. The registration arm 124 has a contact post 138 fixed thereto which is adapted to contact actuator 136 when the registration arm 124 is swung upwardly as seen in FIG. 4. A return spring 140 surrounds the actuator 136 and post 138, yieldably moving the registration arm 124 downwardly as seen in FIG. 2. A flat horizontal document card bed 142 having an aligner rail 144 on one side is disposed downstreamm with respect to the roll 128 (see FIG. 9). Aligner springs 146 are disposed opposite the rail 144 for pushing a card 50 firmly against the rail 144, and a swingable cover 148 is disposed above the bed 142 for allowing a card on the bed to be easily removed from the bed, if this is desirable.

Figure 6:
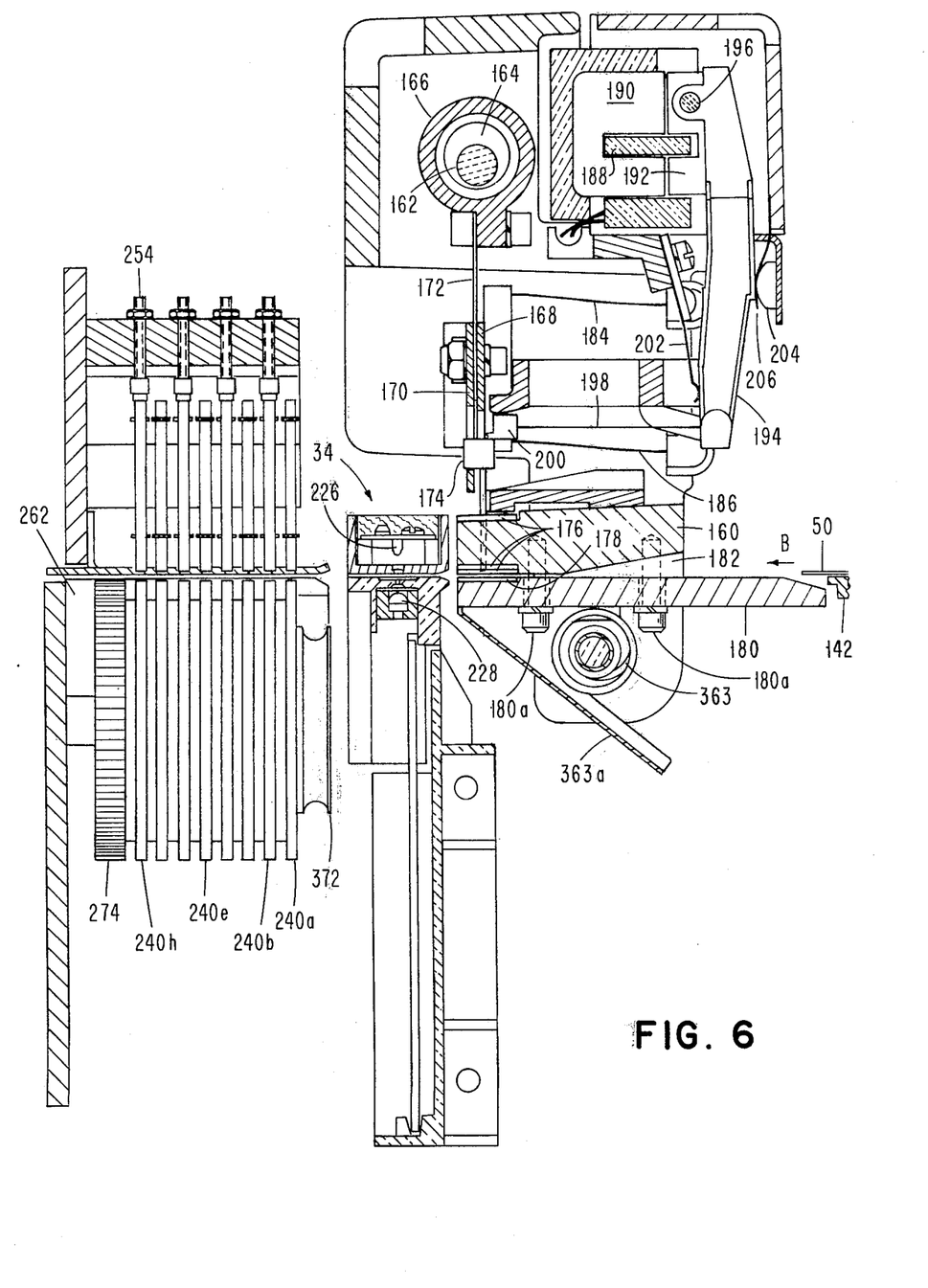
FIG. 6 is a vertical sectional view of the punch, read and print mechanisms of the machine adjacent the other or second end of the machine.

The punch unit 32 comprises a unitized punch frame 160 and an input shaft 162 rotatably carried by the punch frame 160 (see FIG. 6). An eccentric 164 is fixed on the shaft 162, and a bearing carrier 166 surrounds the eccentric 164 so that, as shaft 162 rotates, reciprocatory movement is given to the carrier 166. A drive bail 168 and a restore bail 170 are carried by a flexible connector 172 fixed with respect to the bearing carrier 166, and these bails are adapted to be effective on punches 174. The punches 174 are disposed in a row of 12 extending transversely across the card bed 142 and extend through stripper plates 176 and are adapted to pass through a die plate 178. The die plate 178 is disposed in a card bed 180 that is in alignment with the bed 142. The upper surface of the bed 180 and the lower surface of the punch frame 160 are so fashioned as to provide a tapered card inlet opening 182 leading to the die 178. The bails 168 and 170 are supported from the frame 160 by means of parallel springs 184 and 186.

An electromagnet including a coil 188 disposed on a U-shaped core 190 is provided for each of the punches 174. A magnet armature 192 is disposed adjacent the ends of each of the cores 190, and each armature 192 is carried by an arm 194 swingably mounted by means of a shaft 196. An interposer leaf spring 198 has one end fixed with respect to each of the arms 194 and carries an interposer tip 200 on its other end which is adapted to be interposed between the drive bail 168 and the corresponding punch 174 when the coil 188 is energized. A return spring 202 is provided for each of the arms 194, and a backstop 204 of rubberlike material shielded by a plastic film sheet 206 is provided for each of the arms 194.

The read mechanism 34 comprises an upper casing 220 and a lower casing 222 (see FIG. 7) which are separated to provide a card path 224 between them. The upper casing 220 includes a light source 226, and the lower casing 222 has a phototransistor 228 for each of the 12 openings that may be punched into a card 50.

Figure 11:
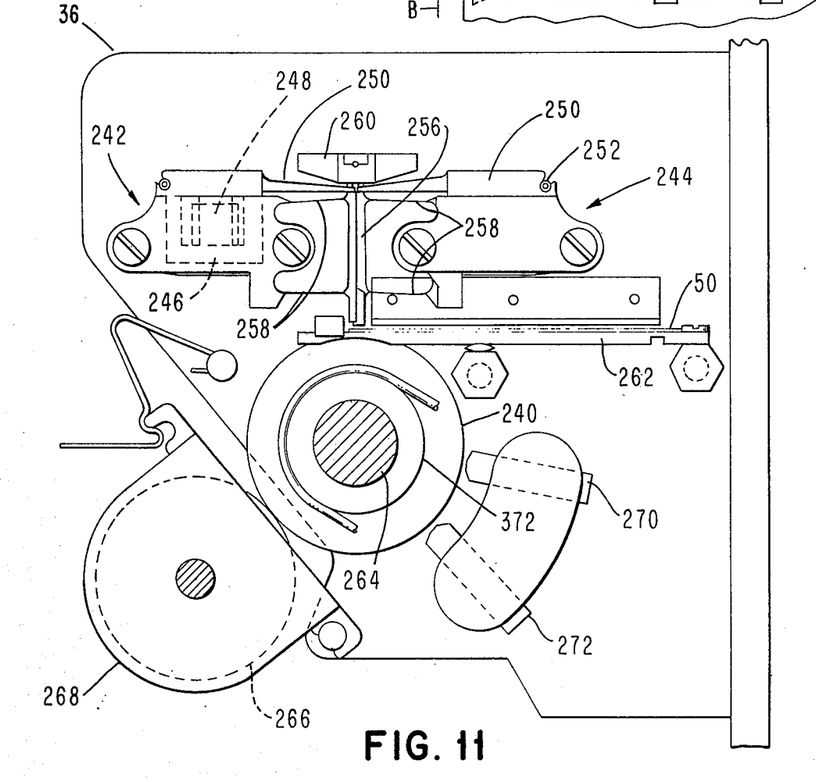
FIG. 11 is a sectional view taken on line 11—11 of FIG. 2 and showing the print mechanism of the machine.
Figure 12:
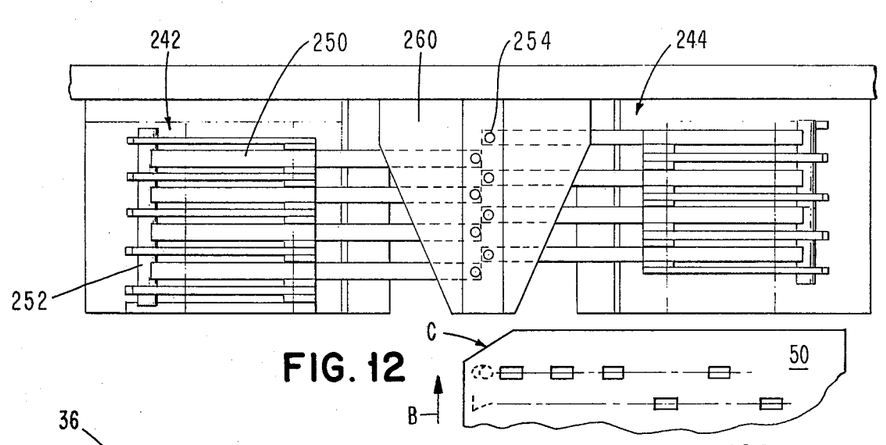
FIG. 12 is a plan view of the print mechanism.

The print unit 36 comprises a print drum 240 and a pair of opposite print hammer assemblies 242 and 244 (see FIGS. 6, 11 and 12). Each of the assemblies 242 and 244 has a series of E-shaped cores 246, and a coil 248 is disposed about the center element of each of the cores 246. An armature 250 is disposed above each of the cores 246 and is swingably mounted at one end by means of a fixed tube 252. The opposite end of each armature 250 is interposed between an adjustment screw 254 that forms an up-stop and a print hammer 256. A pair of parallel flexures 258 support each of the hammers 256 so that the hammers move in a substantially parallel fashion toward the print drum 240. The adjustment screws 50 are disposed in a fixed adjustment bar 260. A bed plate 262 underlies the print hammer assembly and defines a transport path for a document card 50 that is to pass through the print mechanism 36. The print drum 240 is exposed to the document path through apertures in bed plate 262 and presents a sequence of embossed characters at each print hammer position along a print line on the documents 50. The print drum 240 is fixed on a drive shaft 264 which extends parallel with bed 142 and is disposed at a lower level than bed 142. The drum 240 has a series of circumferential rows 240a–240h of print characters on its periphery. An ink roll 266 rotatably disposed in a housing 268 rotates in contact with the print drum 240 to provide an ink film on the print characters for a transfer to a document card 50 during printing. A pair of emitter pick ups 270 and 272 sense the passage of teeth on emitter wheels 274 (see FIG. 11) which rotate in unison with the character drum 240 to provide information as to when a character will be positioned at the print position for a print operation.

Figure 10:
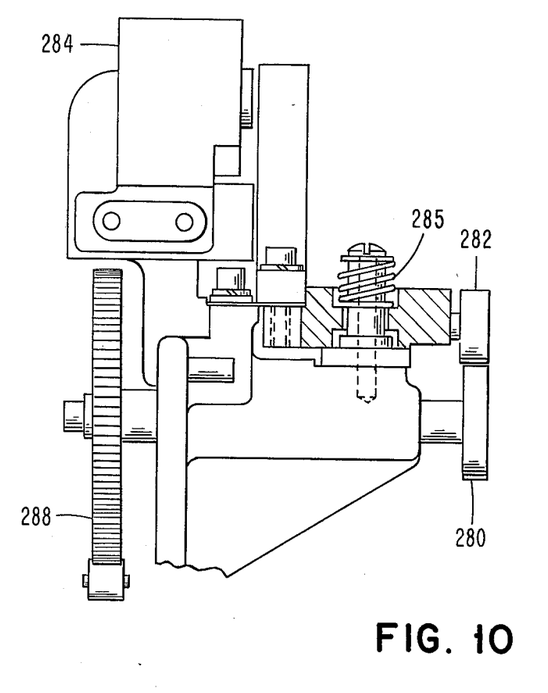
FIG. 10 is a sectional view on an enlarged scale taken on line 10—10 of FIG. 2.

A document card 50 is incremented through the punch mechanism 32 by means of an incrementer roll 280 and a pressure roll 282 adapted to have a pressure nip with roll 280 (see FIG. 10). An electromagnet 284 is effective to move pressure roll 282 upwardly against the action of return spring 285. The incrementer roll 280 is driven in rotative increments by means of geneva mechanism 286 comprising a slotted disk 288 and a drive disk 290 having a pin 292 eccentrically fixed thereon and adapted to enter the slots in the disk 288 one after the other. A detent roll 294 carried by a leaf spring 296 is adapted to engage the disk 288 in its notches for holding the disk 288 and incrementer roll 280 in incremented positions.

Figure 8:
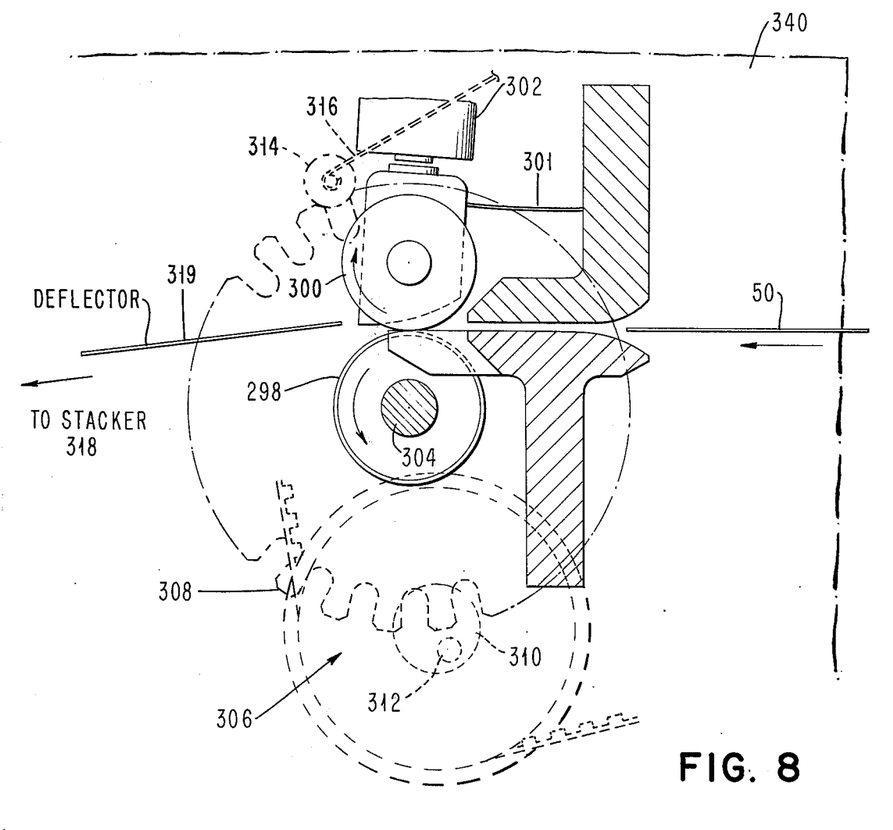
FIG. 8 is a vertical sectional view of the document card discharge portion of the machine at the second end of the machine.

An incrementer roll 298 and a pressure roll 300, which has a pressure nip with the roll 298, are located downstream with respect to the print mechanism 36 (see FIGS. 2 and 8). Roll 300 is supported by leaf spring 301. An electromagnet 302 moves the roll 300 with respect to the roll 298 against the action of spring 301. The pressure roll 298 is fixed on a drive shaft 304, and a geneva mechanism 306 drives the shaft 304. The geneva mechanism 306 is similar to the geneva mechanism 286 and comprises a slotted disk 308 and a drive disk 310 having a pin 312 adapted to enter the slots of the disk 308 one after the other. A detent roll 314 carried by a leaf spring 316 is adapted to enter the notches of the disk 308 and hold the disk 308 and therefore the incrementer roll 298 in incremented positions. The rolls 298 and 300 are disposed adjacent to a document card stacker 318 into which the cards 50 are discharged by the rolls 298 and 300. A card deflector 319 deflects cards 50 passing from the rolls 298 and 300 into stacker 318.

The machine is preferably supplied with a cover 320 (see FIG. 1), and the stacker 318 extends through a slot 322 in an end panel 324 of the cover 320. The upper portions of the hopper mechanism 30, including the back shoe 44, extend upwardly through an opening 326 provided in the top panel 328 of the cover 320.

Figure 3:
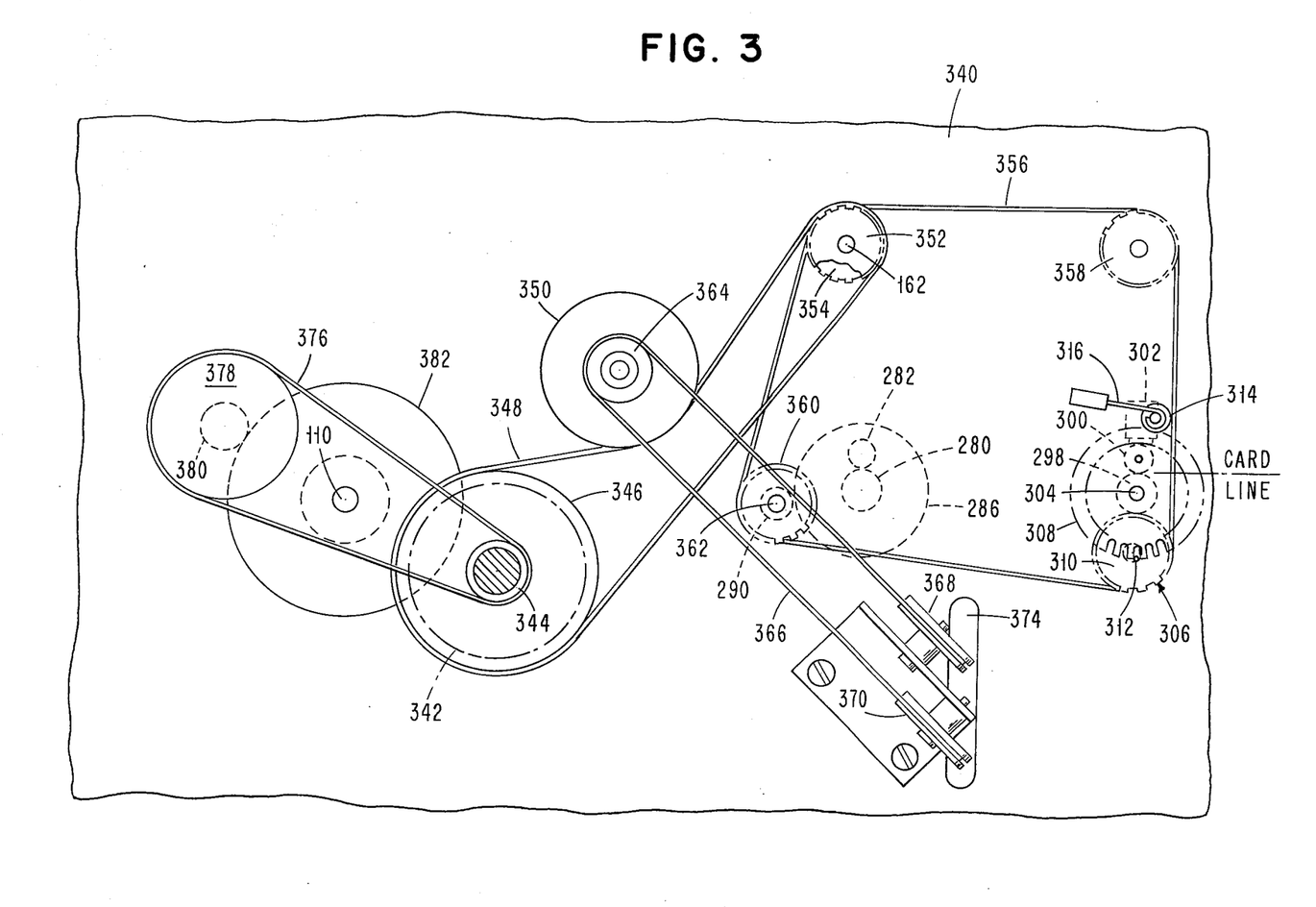
FIG. 3 is a rear elevational view of the internal mechanism of the machine.
Figure 13:
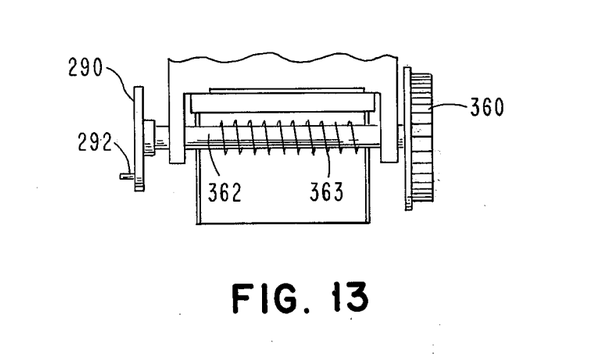
FIG. 13 is a view taken on line 13—13 of FIG. 2.

The various fixed parts of the machine, such as the hopper base 38, the bed 142, etc. are attached to a machine backbone or standard 340; and the geneva mechanism 306 is disposed on the rear surface of the backbone 340, while the geneva mechanism 286 is disposed on the front of the machine as is apparent from FIG. 2. An electric motor 324 (see FIG. 3) is the driving means for the machine, and the motor has driven pulleys 344 and 346 on its output shaft. A belt 348 extends around the pulley 346 and also around pulleys 350 and 352 as shown in FIG. 3. A pulley 354 is coaxially fixed with respect to the pulley 352, and a toothed belt 356 extends around the pulley 354 and also around pulleys 358 and 360 in addition to disk 310 which is externally toothed similarly to the pulleys 354, 358 and 360. The pulleys 352 and 354 are fixed on the shaft 162 driving the punch mechanism 32. The pulley 360 is fixed on a shaft 362 by means of which the disk 290 is driven. A chip auger 363 (see FIG. 13) in the form of a coiled wire is fixed on the shaft 362 and lies under the die plate 178 for distributing chips from the punch mechanism 32. A chip chute 363a lies below the auger 363 (see FIG. 6).

A pulley 364 is fixed to the pulley 350, and a belt 366 extends around pulley 364 and also around pulleys 368, 370 and 372 (see FIGS. 3 and 6). The pulley 372 is fixed with respect to the print drum 240, and the pulleys 368 and 370 are mounted on the rear surface of the backbone 340 in such a manner that the belt 366 passes through a slot 374 in the backbone to the pulley 372.

A belt 376 extends around the pulley 344 and also around a pulley 378. A friction roll 380 is fixed with respect to the pulley 378 and is in frictional engagement with a large diameter friction roll 382. The roll 382 is fixed on the shaft 110 for driving the roll 86 (see FIG. 2) and thereby the belt 82 of the hopper mechanism 30.

In operation, document cards 50 from a card deck 48 are fed one at a time downwardly out of the hopper 46, with each document card being so fed when the pick magnet 102 (see FIGS. 2 and 4) is energized. The cards 50 may be the standard IBM 80 column cards which are about 7⅜ inches long and 3¼ inches wide. These cards have 12 rows extending longitudinally and 80 columns extending transversely of the card for punched holes. The columns are spaced 0.087 inch apart measured from their centers, and the centers of columns 1 and 80 are ¼ inch from the respective ends of the card. The distance from the center of column 1 near one end of the card to the other end of the card (which may be considered its trailing end) is thus 7⅜ inches minus ¼ inch or 7⅛ inches. The cards are placed in the hopper 46 with their long dimensions vertical and with the printed front faces of the cards adjacent panel 42, and preferably with column 1 down, resting on horizontal hopper base 38. The cards 50 may be unpunched; and, in this case, the machine may punch the cards in the 80 columns and 12 rows by means of the punch mechanism 32, the machine may then read these punched openings by means of the read mechanism 34; and the machine may then print a row C of printed characters on a long edge of the card (see FIG. 12). Alternately, if the cards 50 when placed in the hopper 46 have been previously punched, the read mechanism 34 may be used for reading the punched openings in the cards.

The cards 50 are placed as a deck 48 in the hopper 46 by pulling shoe 44 backwardly against the action of the springs 62 effective on the ribbons 52 and 54. The back shoe 44 is then released, and it bears by means of its projection 44a and the throat spring 76 against the card deck 48. The cards bear against the panel 42, the U-shaped member 100 surrounding the roll 80 and the throat ramp 68 at the front of the card deck 48.

The belt 82 is driven in the direction A by the roll 86 driven from the motor 342. The motor 342 is so effective through the power train which includes the pulleys 344 and 378, the friction rolls 389 and 382 and the shaft 110 on which the roll 86 is fixed. When a command is given to energize the pick magnet 102, the magnet 102 is then effective to move the roll 80 and the belt 82 on the periphery of the roll 80 through the opening 78 in the front panel 42 and into contact with the forwardmost document card 50 in the hopper 46. The electromagnet 102 is effective on the bell cranks 94, swinging the bell cranks 94 for this purpose. The roll 80 and belt 82 at this time move the card deck 48 slightly off of the ends of the U-shaped member 100, such as by 0.03 inch. The belt 82 in contacting the endmost document card 50, propels this card 50 downwardly through the throat gap 72 defined by the throat ramp 66 and the throat knife 70. The gap 72 is adjusted to be just slightly greater in width than the thickness of one of the cards 50, assuring that only one card 50 may travel at a time between the throat knife 70 and the throat ramp 68. As the lower end of the card 50 moves through the gap 72, it is engaged in the nip between the belt 82 and the roll 112, so that the card 50 is drawn farther downwardly to be gripped between the idler roll 88 and the belt 82. The spring 118 (see FIG. 2) acting on the swing arms 116 and thus on the roll 90 assures that the nip between the belt 82 and the roll 112 is a pressure nip for assuring this movement of a card 50.

The card 50 continues to travel with the belt 82 and thus moves around roll 88 until its leading end strikes the cam portion 124b (see FIG. 4) of the registration arm 124. The registration arm 124 is thus moved upwardly so as to be out of the gap 122 as the card moves through this gap. As the arm 124 is swung, the contact post 138 moves against the switch actuator 132, thus closing the switch 134 and thereby indicating that a card 50 is in the hopper mechanism 30 beneath the roll 88. This movement of the registration arm 124 is against the action of the spring 140 which normally holds the arm 124 downwardly to the limit of its movement.

As the card 50 continues its movement, driven by the belt 82 and roll 88 onto the horizontal bed 142 and moving in card path B, eventually the trailing end of the card 50 passes beyond the registration portion 124c of the arm 124, allowing the arm 124 to drop under the action of the spring 140. Switch 134 then opens. The card is at this time held between the roll 128 and the roller 132 carried by the arm 124. The roll 128 is in contact with the belt 82 and is driven thereby in the reverse direction (with its upper peripheral surface rotating reversely with respect to the direction of movement of the card 50 travelling onto the bed 142), and the binding action between the roller 132 and roll 128 under the action of the spring 140 causes the card 50 on the bed 142 to reverse its direction of movement. The card 50 has overshot to a slight extent the registration portion 124c of the arm 124, and the card 50 travels reversely for a slight distance. The registration portion 124c of the arm 124 is in the path of movement of the card 50 in this, its reversed direction of movement; and the card 50 strikes the registration portion 124c of the arm 124 and is held in this position by the reversely rotating roll 128. At this time, the card 50 is exactly registered for the first punching operation on the card, and its column 1 is exactly registered with the punches 174, with the card 50 being disposed in the card inlet opening 182 of the punch mechanism 32. The card 50 is supported by the bed 142, and the aligner springs 146 (see FIG. 9) hold the card firmly in contact with the aligner rail 144. The sprins 146 have been deflected to force the card against the rail 144 as the card has fed from the gap 122 onto the bed 142. It is apparent that the card 50, which is in vertical disposition in the hopper 46, has been turned through substantially 90° in being moved onto the bed 142 into its Column 1 punching position; since the bed 142 is horizontal.

As the card 50 travels past the pinch point between the rolls 90 and 112, the pick magnet 102 is de-energized; and the pick roll 80 and belt 82 move away from the card deck 48. The deck 48 is then held from the feed belt 82 by the deck support 100; and scrubbing of the belt 82 on the second card of the deck 48, as the first card 50 passes downwardly, is thus eliminated.

With the card 50 being held in contact with the registration portion 124c of the arm 124 by the action of the reversely rotating roll 128, with the arm 124 being at the lowermost limit of its movement; a punching action by the punch mechanism 32 begins. The appropriate ones of the coils 188 corresponding to the holes that should be punched in column 1 are energized, pulling the corresponding ones of the arms 194 to the left as seen in FIG. 6. The shaft 162 is continuously driven from the motor 342 by means of the pulleys 346 and 352, and the bails 168 and 170 are thus reciprocated by means of the eccentric 164 fixed to the shaft 162. The ones of the arms 194 urged to the left by energization of the corresponding ones of the coils 188 move the corresponding interposed tips 200 between the drive bail 168 and the corresponding punches 174; and, on the next downward reciprocation of the bail 168, the corresponding punches 174 are moved downwardly through the die 178, punching corresponding openings in column 1 of the card 50. The punches 174 that are so effective are then withdrawn from the card 50 by means of the restore bail 170 on the next upward reciprocation of the bail 170. The card 50 is then incremented forwardly along the bed 142 by means of the incrementer roll 280.

The geneva mechanism 286 is driven from the pulley 354 (fixed with respect to the pulley 352) by means of the belt 356, the pulley 360 and the shaft 362. On a revolution of the shaft 362 and the disk 290, the pin 292 enters a slot in the slotted disk 288 and increments the slotted disk 288 and the incrementer roll 280 one rotative increment. Just before the first incremental movement of the card 50 is in order for the second punching action by the punching mechanism 32, the electromagnet 284 has been de-energized so that spring 285 moves the pressure roll 282 to have a force nip with respect to the roll 280, and the rolls 280 and 282 move the card 50 so that column 2 of the card is in alignment with the punches 174 in lieu of column 1 of a card. At this time, with card 50 being stationary at the end of the first incrementing action by geneva mechanism 286, the coils 188 corresponding to the holes that are to be punched in column 2 of the card are energized urging the arms 194 and the interposer tips 200 to the left as seen in FIG. 6; and the punches 174 are again effective for punching holes through the card 50, this time in column 2 of the card 50.

The rolls 280 and 282 are subsequently effective to incrementally move the card 50 in path B so that its succeeding columns are in alignment with the punches 174; and, for each of these additional columns, the appropriate ones of the coils 188 are energized causing the corresponding ones of the punches 174 to be effective to perforate the card 50.

Figure 7:
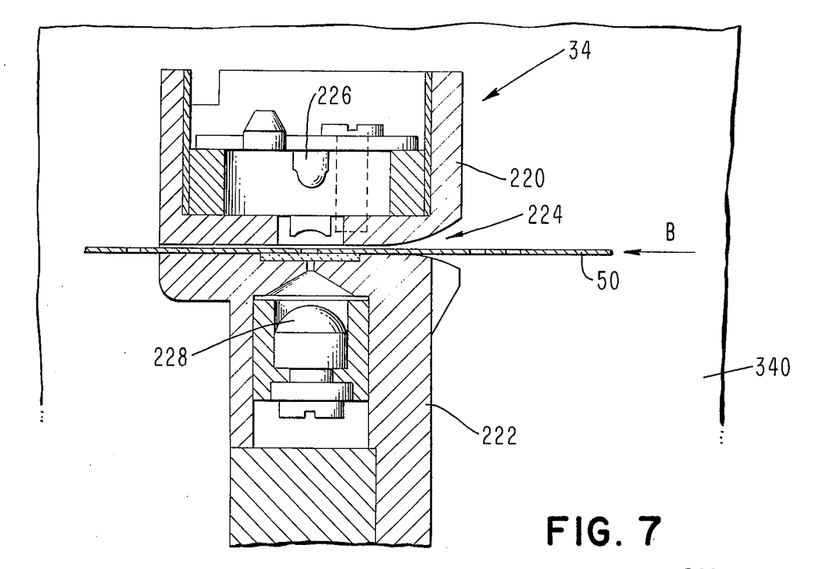
FIG. 7 is a vertical sectional view on an enlarged scale of the read mechanism of the machine.

The rolls 280 and 282 also increment the card 50 through the read mechanism 34 in card opening 224 (see FIG. 7). The light source 226 causes light to pass through each of the punched holes in the document card onto the corresponding phototransistor 228. These transistors are thus energized by the light, indicating the presence of a punched hole for each of the energized phototransistors. Since the read mechanism 34 is physically placed downstream with respect to the punch mechanism 32, the read mechanism 34 may be used as a punch checking device as well as a simple read station.

The incrementer roll 280 and pressure roll 282 continue to increment the card 50 into and through the print mechanism 36 in card path B, with the card 50 passing over the bed plate 262 (see FIGS. 6, 11 and 12). Each time the card 50 is stopped, between increments, a print hammer 256 may be driven downwardly so as to cause a particular character on the periphery of the print wheel 240 to be printed on the undersurface (printed face) of the card 50. Each of the hammers 256 is so moved by energization of the corresponding coil 248 so as to move the corresponding armature 250 and hammer 256. The hammer movement is against the inherent flexibility of the parallel flexures 258 which return the hammer 256 to de-energized (raised) position after de-energization of the corresponding coil 248.

The print drum 240 is maintained in continuous rotation, with the motor 342 being the prime mover. The drive from the motor 342 is through the belt 348, the pulleys 350 and 364, the belt 366 and the pulley 372 coaxial with the print wheel 240, with the idler pulleys 368 and 370 functioning to change the direction of the belt 366.

The print hammers 256 are in a row extending parallel with card path B and are in alignment on a single line C extending longitudinally of the card 50 adjacent a long side edge of the card. The hammers 256 are spaced apart on centers the same distances as the columns in a card 50. The print drum 240 has a row of characters (240a–240h) on its periphery corresponding to each of the hammers 256 and spaced apart the same as the hammers 256; and, assuming that a full alphabet and set of numerals are to be printed by the print mechanism 36, each of the rows of type characters will include a portion of the alphabet or set of numerals, with patterns of these characters being repeated around the complete periphery of each of these rows. For each incremental movement of the card 50 through the printing mechanism 36, each of the hammers 256 will be effective to provide a printing action, assuming that the particular type characters beneath the particular print hammer 256 include one of the type characters that is to be printed at that particular position on the card. It is contemplated that the incrementing motion of the card 50 through the printing mechanism will be so fast that a complete rotation of the print drum 240 will not be possible between incrementing motions of the card; and, therefore, the eight hammers 256 and the corresponding eight character rows 240a–240h on the print drum 240 are provided so that all characters of the alphabet and all numerals may be printed in all of the column positions on the card 50. It is contemplated that a printed character shall be possible at each of the column positions on the card, corresponding to the punched openings in that particular column provided by the punch mechanism 32, and the print mechanism 36 produces the print line C extending along and adjacent a longitudinal side edge of the card 50 (see FIG. 12). Although the printing by the unit 36 (as well as the punching action by punches 174) is only accomplished between incremental movements of the card 50, it will be appreciated that the printer 36 is basically of the "on the fly" type, with the type drum 240 continuously rotating at high speed under the driving action of the motor 342.

When the card 50 is incremented through the print mechanism 36 all the way to the incrementer roll 298 (see FIGS. 2 and 8), the rolls 298 and 300 assist the rolls 280 and 282 in incrementing the card 50 through the machine. The geneva mechanism 306 is effective to drive the incrementer roll 298, and the geneva mechanism 306 is driven from the belt 356 passing around the notched disk 310. The belt 356 is internally toothed, and the roll 360 and disk 310 are externally toothed to have intermeshing engagement with the belt 356 for maintaining the disk 310 of the geneva mechanism 306 and the disk 290 of the geneva mechanism 286 rotating in timed relationship with each other. Thus, the incrementing actions by the incrementer rolls 280 and 298 are the same with respect to the card 50.

The incrementer roll 280 maintains an incrementing action on the card 50 until column 80 of the card passes between the rolls 280 and 282, and thereafter the incrementing roll 298 alone is effective to draw the card 50 through the read mechanism 34 and the print mechanism 36. After printing has been completed, the rolls 298 and 300 move the card 50 into the stacker 318, and the rolls 298 and 300 are preferably so positioned with respect to the path of movement of the card 50 that the roll 298 has its peak incrementing velocity just as the card 50 passes through the nip of the rolls 298 and 300 to assure that the card 50 is moved at maximum velocity into the stacker 318 for proper stacking.

Subsequent ones of the cards 50 in the hopper 46 are moved through the machine in the same manner as has just been described for the first card 50 of the deck 48.

Advantageously, the machine for punching, reading and printing the 80 column document cards is very compact, is light weight and may be used as a table top machine. It has a corresponding low cost. The compactness is particularly due to the closely spaced punch, read and print mechanisms 32, 34 and 36 and to the manner in which the punch and print mechanisms are disposed with respect to the direction of card travel. The compactness is also due to the use of the vertical hopper mechanism 30 in conjunction with the rest of the machine.

The hopper mechanism 30 effectively provides dual directions of card travel and dual dispositions of the cards as they travel. The cards 50 are stacked vertically in the hopper 46; and, as the cards are successively moved out of the hopper 46, the cards move from left to right as seen in FIG. 2 and through throat gap 72.

The cards are effectively turned through 90 degrees by the roll 88 and belt 82 into horizontal disposition on the bed 142, and then the cards travel in the opposite direction, from right to left as seen in FIG. 2. The hopper design as described results in the card deck 48 and most of the hopper mechanism 30 being located over the subsequent card path and registration area on the bed 142, and consequently a much more compact machine is realized without loss of accessibility of the card transport to the machine operator. As is apparent from FIG. 1, in particular, the machine operator has access to the hopper 46 from the top of the machine and may load the machine with cards 50 by simply setting them down as the deck 48 into the hopper 46 after moving shoe 44 back against springs 62.

In attaining this compactness of design, the interposer springs 198 of the punch mechanism 32 extend longitudinally of the card path B, overlying the bed 142 and the card path at its upstream side prior to the punches 174. Likewise, the coils 188, cores 190 and swing arms 194 overlie the path of card travel as the cards approach the punches 174. Since the registration arm 124 positions a card 50 with its column 1 in position to be punched by the punches 174, less than the length of a single card need exist between the registration portion 124c and the punches 174. The light source 226 and the phototransistors 228 of the read mechanism 34 are located immediately downstream (in card path B) with respect to the punches 174, and the center line of the light source 226 and transistors 228 may be located only the distance of eight columns on a card 50 from the center lines of the punches 174. A close spacing of the read mechanism 34 to the punch mechanism 32 is obtained particularly due to the fact that the die plate 178 and stripper plate 176 and bed 180 are cantilever mounted as by means of screws 180a at the upstream side of the punches 174 along the card path B.

The registration of a card 50 along its longitudinal edge on bed 142 is maintained by the single aligner rail 144 which extends the full length of the bed 142 between the registration portion 124c of the registration lever 124 and the center line of the punches 174. The rail 144 is accurately located with respect to the punch mechanism 32 and eliminates much assembly and service time as well as being ideal for good registration of the cards 50 prior to and during punching.

The first character row 240a on the print wheel 240 may be located only 18 card increments or columns beyond the center line of the punches 174. In order to take up a minimum of space, the armatures 250 of the print mechanism 36 extend transversely of the path B of card travel through the print mechanism, with half of the armatures 250 and coils 248 being disposed on one side and the other half being disposed on the other side of the line of print C from hammers 256 along a longitudinal side edge of a card 50, as is apparent from FIGS. 11 and 12.

Advantageously also, it will be noted that the single incrementer roll 280 (with its pressure roll 282) is used for incrementing a card 50 through the punch mechanism 32 assuring accuracy of spacing of the punchings in the successive columns on the card. The subsequent incrementer roll 298 only takes over after the card 50 has reached its position with column 80 being under the punches 174. Since the single incrementer roll 280 is effective during punching, this eliminates multiple control magnets and associated circuitry as well as minimizing the exposure to misregistration due to transferring from one incrementer roll to the next incrementer roll before punching has been completed.

Since the read mechanism 34 is placed immediately downstream from the punch mechanism 32, a dual use of the read mechanism is permitted, namely, as a simple read unit on previously punched cards inserted as a deck in the hopper 46 and as a punch checking device for cards that have just previously been punched by the punch mechanism 32. Since the punch, read and print mechanisms are placed so closely together, simultaneous punching, reading and printing on the same card 50 occurs, thus reducing error recovery procedures to a simple one or two card diagnosis. This shortens the time element significantly for the machine operator to find a card in error.

For additional information regarding various mechanisms and units in this machine, the following patent applications, publications and patents may be referred to:

Additional details of the print mechanism 36 may be obtained by referring to the patent application of P. M. Charlson et al, Ser. NO. 320,249, filed Jan. 2, 1973 (now U.S. Pat. No. 3,811,377), and additional details of geneva mechanisms suitable for use as the mechanisms 286 and 306 may be obtained by referring to the publication "IBM Technical Disclosure Bulletin," entitled "Geneva Mechanism" by R. W. Luoma, Volume 14, No. 3, August, 1971, page 797. The hopper mechanism 30 is disclosed and claimed per se in the copending patent application of Mark C. Agnew, James J. Best and Willard L. Gudgel, Ser. No. 461,469, filed Apr. 16, 1974, for "Hopper Mechanism."

We claim:

1. A processing machine for document cards having a first, hopper end and second, opposite end and comprising:

means forming a hopper at said first end of the machine for holding document cards vertically disposed and in the form of a horizontal card deck and including a horizontal hopper base on which said cards are disposed, said hopper base being provided with a throat gap through it at said first end of the machine through which a said card of the deck at said first machine end may pass moving downwardly, and means forcing said card deck along said horizontal hopper base in the direction from said second machine end to said first machine end so that said cards may feed one at a time downwardly through said throat gap, a flat horizontal document card bed disposed at a lower level and at least partially below said hopper base, means for changing the direction of movement of a said card passing through said throat gap from vertical to horizontal and disposing said card for forward travel in a path on said horizontal card bed toward a distal end of the card bed, said direction changing means including a rotatable roll disposed beneath said hopper base and above said horizontal bed around which the card is constrained to travel for approximately 90° of rotation, a first operative means for operating on a said card and located beyond said distal end of said horizontal bed and in said path of travel of the card, a second operative means for operating on a said card in said path of travel and located beyond said first means in said card path, said second operative means including a printer roll having an axis of rotation parallel with said card path, means for driving said printer roll, a row of print hammers extending parallel with the axis of said print roll and with said card path, and an electromagnet for actuating each of said print hammers each including a moveable armature, said electromagnets for alternate ones of said print hammers in said row being positioned on opposite sides of said path of card travel and said armatures of said electromagnets correspondingly being positioned on opposite sides of said row of print hammers and extending transversely of said path of card travel, and means for moving a said card forwardly of said card bed and consecutively through said first operative means and then through said second operative means for operating on a said card.

2. A document card processing machine as set forth in claim 1, said first operative means for acting on a document card including a row of punches extending transversely of said path of card travel and means for actuating each of said punches, means for registering the trailing end of said document card when located on said card bed and including an abutment which is moveable out of the path of card travel across said bed to allow movement of the card onto the bed and is moveable back into the path of card travel when the card passes beyond the abutment moving forwardly in said path across said card bed toward said first and second operative means, and means for reversing the direction of movement of the card on said bed after it has initially passed said abutment moving in the forward direction so as to move said original trailing end of the card into contact with said abutment then positioned in said path of card travel to thereby move the card into a registered position in which said punches are operative to punch the card adjacent the leading edge of the card.

3. A document card processing machine as set forth in claim 2, the distance between the centers of said punches and said abutment being about 7 1/8 inches.

* * * * *